United States Patent [19]

Hochradel et al.

[11] 4,047,677

[45] Sept. 13, 1977

[54] TRANSMIT AND RECEIVE TERMINAL FOR SINGLE TUBE PNEUMATIC CARRIER SYSTEM

[76] Inventors: Ernest Hochradel, 61 Edison Terrace, Sparta, N.J. 07871; Werner Hauer, 381 Passaic Ave., Nutley, N.J. 07110

[21] Appl. No.: 722,497

[22] Filed: Sept. 13, 1976

[51] Int. Cl.² .................................. B65G 51/32
[52] U.S. Cl. ................................ 243/19; 221/191; 221/298; 243/24
[58] Field of Search ................... 243/19, 20, 23, 24, 243/25, 28, 38; 221/191, 261, 298; 198/389, 390, 406, 526, 531, 540; 193/38, 25 FT

[56] References Cited

U.S. PATENT DOCUMENTS

| 984,223 | 2/1911 | Jones | 221/298 X |
|---|---|---|---|
| 2,341,014 | 2/1944 | Blair | 221/298 X |
| 3,113,816 | 12/1963 | Hulsey | 221/191 X |
| 3,333,787 | 8/1967 | Voitas et al. | 243/16 R |
| 3,998,405 | 12/1976 | Carlier | 243/19 |

FOREIGN PATENT DOCUMENTS

| 1,247,963 | 8/1967 | Germany | 243/24 |
|---|---|---|---|
| 1,277,752 | 9/1968 | Germany | 243/24 |

Primary Examiner—Johnny D. Cherry
Assistant Examiner—James L. Rowland
Attorney, Agent, or Firm—Wood, Herron & Evans

[57] ABSTRACT

A terminal for a single-tube pneumatic tube system adaptable for use in either an up-send/down-receive, or an up-receive/down-send, configuration. The terminal includes a send hopper into which a plurality of carriers can be inserted and stored prior to transmission on a sequential basis, an empty carrier hopper and a full carrier hopper which respectively store empty and full carriers transmitted to the terminal, and a transfer tube which reciprocates between positions aligned with the system tube, send hopper and empty and full carrier hoppers for transporting carriers therebetween.

13 Claims, 20 Drawing Figures

TRANSMIT AND RECEIVE TERMINAL FOR SINGLE TUBE PNEUMATIC CARRIER SYSTEM

This invention relates to single tube pneumatic tube systems, and more particularly to a terminal for a single tube pneumatic tube system which can be used in either an up-send/down-receive or a down-send/up-receive configuration.

In a pneumatic tube system of the single tube type, with which the terminal of this invention is particularly advantageous, a single carrier-conveying pneumatic tube interconnects each pair of stations in the system. Carriers move through the single system tube in opposite directions depending upon whether the carrier is being transmitted to a particular station or from such station. To facilitate bidirectional carrier motion in the single system tube which interconnects each pair of stations, a dual mode air supply is connected to the system tube operable in either a sub-atmospheric mode or a super-atmospheric mode. In the sub-atmospheric mode, e.g., when transmitting, a carrier is pulled from a particular station, while in the super-atmospheric mode, e.g., when receiving, the carrier is pushed to the station.

In one type of terminal configuration useful at stations of a single tube system, termed the "up-send/down-receive" type, the single system tube connects to the upper end of the terminal such that incoming carriers move downward through the open lower end of the system tube into the terminal, while outgoing carriers move upwardly. In another type of terminal suitable for use with stations in single tube systems, termed the "up-receive/down-send" type, the system tube is connected to the bottom of the terminal such that incoming carriers move upwardly into the terminal through the open upper end of the system tube, whereas outgoing carriers leaving the terminal move downwardly.

The particular type of installation at a station, i.e., up-send/down-receive or down-send/up-receive, depends upon the nature and location of the station relative to the building in which the system is installed. For example, if the single carrier-conveying system tube which interconnects the various stations is designed to run along the ceiling, and the system tube in question interconnects two stations on the same floor, the terminals are typically of the up-send/down-receive type. Specifically, since the terminals are located at some convenient level above the floor, such as three feet, and since the system tube extends down from the ceiling the typical up-send/down-receive terminal is connected to the system tube at some point along the top of the terminal. Alternatively, if the system tube runs along the floor and two stations on the same floor are to be connected, the system tube typically connects to the terminal at the bottom thereof, providing an up-receive/down-send configuration.

One of the objectives of this invention has been to provide a terminal for a single tube system which is readily adaptable to interconnection with a system tube in either the up-send/down-receive or the down-send/up-receive configuration. It has also been an objective of the invention to provide a terminal of the type indicated which will store multiple carriers inserted into the terminal for subsequent transmission on a sequential basis and which, as well, will store multiple carriers which have been received from distant stations on a sequential basis.

The foregoing objectives have been accomplished in accordance with a preferred form of the invention by providing a terminal having a send hopper, at least one received-carrier hopper, and a carrier transfer tube selectively positionable in alignment with the system tube, send hopper and received-carrier hopper to transfer carriers between the system tube and the various hoppers.

The send hopper, into which multiple carriers can be sequentially inserted for temporary storage prior to sequential transmission from the terminal via the single carrier-conveying system tube, includes a pair of elongated downwardly and rearwardly spaced parallel inclined carrier guides configured to underlie and engage diametrally opposed shoulder portions by the enlarged head present on the carrier. The guides support in vertical disposition therebetween a plurality of carriers so engaged for gravity-induced sliding movement in the downward and rearward direction from a carrier entrance and to a carrier exit end, with the exit end being lower than the entrance end. The send hopper also includes a carrier release assembly mounted proximate the exit end for selectively releasing carriers on a sequential basis whereupon the released carriers move downwardly under the force of gravity. The carrier transfer tube, which shuttles carriers between the system tube and the various hoppers, is vertically disposed and open at its upper and lower ends for receiving and temporarily storing carriers. A selectively releasable detent projects into the interior of the transfer tube for supporting a vertically disposed carrier therein. The received-carrier hopper, which temporarily stores a plurality of received carriers sequentially transmitted to the terminal via the carrier conveying system tube, includes a pair of elongated downwardly and forwardly inclined carrier guides configured to underlie the enlarged head provided on a carrier. The guides support in vertical disposition a plurality of carriers for gravity-induced sliding movement into a downward and forward direction from a carrier entrance end to a carrier exit end, with the exit end being lower than the entrance end.

A transfer tube mount and drive assembly reciprocates the vertically disposed transfer tube, which is open at its upper and lower ends, in a horizontal path between a) a first position in which the upper end of the transfer tube underlies the exit end of the send hopper to receive in the transfer tube for support by the detent a downwardly moving carrier released from a send hopper, b) a second position in which the transfer tube is aligned with the carrier-conveying tube for delivery of a carrier stored therein to the carrier-conveying tube for transmission from the terminal, and c) a third position in which the lower end of the transfer tube overlies the entrance end of the received-carrier hopper for downward gravity-induced delivery of a received carrier thereto upon release of the transfer tube detent.

If the system is of the up-send/down-receive type in which the carrier-conveying system tube connects to the upper end of the terminal, the upper end of the transfer tube underlies the lower open end of the system tube when the transfer tube is in its second position to facilitate upward transfer of a carrier to the carrier conveying tube for transmission from the terminal. Alternatively, if the system is of the down-send/up-receive type, in which the transfer tube connects to the bottom of the terminal, the lower end of the transfer tube overlies the carrier-conveying system tube when the transfer tube is in its second position to facilitate downward gravity-induced transfer of a carrier to the carrier-conveying tube for transmission from the terminal upon release of the detent.

In a preferred embodiment of the invention the carrier release assembly associated with the exit end of the send hopper includes a cam follower positioned to engage and be displaced by the transfer tube upon movement thereof to its first position underlying the send hopper. The cam follower is operative upon displacement by the transfer tube to initiate release of a carrier by the carrier release assembly.

In accordance with a further aspect of the preferred embodiment of the invention two separate received-carrier hoppers are provided, one designed to store empty carriers which have been received at the terminal and the other designed to store full carriers received at the terminal.

In accordance with a still further aspect of the preferred embodiment of the invention, particularly useful with the up-send/down-receive type terminal, a closure mounted for movement with the upper end of the transfer tube and positionable proximate the lower open end of the carrier conveying system tube is provided for restricting the flow of air from the carrier conveying tube to brake and thereafter support in the carrier conveying tube a received carrier transmitted to the terminal. In operation, the transfer tube mount and drive assembly positions the transfer tube such that the closure is proximate the lower open end of the system tube when awaiting receipt of a carrier transmitted to a terminal, and upon receipt of the transmitted carrier functions to brake and support it in the system tube until such time as the carrier transfer tube is shifted laterally to align itself with the system tube, whereupon the received carrier drops downwardly under force of gravity into the transfer tube for delivery to one or the other of the carrier-received hoppers.

In accordance with a further aspect of the preferred embodiment of the invention, the carrier detent which is mounted on the transfer tube and projects into the interior thereof, is designed to pivot in an upward direction. With such an arrangement, when the terminal of this invention is utilized in the up-receive/down-send configuration, in which a received carrier enters the terminal in an upward direction, the received carrier momentarily pivots the detent in an upward direction upon passage from the system tube into the overlying transfer tube. When the lower end of the received carrier passes above the detent, the detent pivots downward to its normal position underlying and supporting the received carrier in the transfer tube. The received carrier can then be delivered to one or the other of the received-carrier hoppers by aligning the transfer tube with the desired received carrier hopper and momentarily releasing the detent whereupon the carrier drops vertically downward under the force of gravity into the desired hopper.

One important advantage of the terminal of this invention, in addition to being readily adaptable for use with both up-send/down-receive and down-send/up-receive terminal configurations, is that the terminal itself need not be air sealed. Thus, there are no doors of the terminal providing access to the send and/or receive hoppers which must be closed to facilitate transmission and/or receipt of a carrier at the terminal. In fact, in a preferred embodiment of the invention neither the send hopper nor the empty or full received-carrier hoppers are provided with doors. Since carriers are transmitted to the station under positive pressure, i.e., super-atmospheric pressure, the system tube opening at the terminal need not be closed or sealed to facilitate transmission to the terminal. Similarly, since transmission from the terminal is accomplished by placing the system tube under vacuum, there is no need to seal or close the system tube opening at the terminal from which the carrier is being transmitted.

Another important advantage of the system of this invention is that multiple carriers can be stored in the send hopper for transmission on a sequential basis. Thus, it is not necessary to complete transmission of a first carrier before inserting a second carrier into the send hopper for subsequent transmission. In accordance with this invention, multiple carriers which are to be transmitted can be inserted into the send hopper in rapid succession where they will remain until transmitted on a sequential basis from the terminal. Similarly, since the received-carrier hoppers can store a plurality of received carriers, it is not necessary that a carrier transmitted to the station be removed before the terminal is able to accept a second carrier transmission.

These and other advantages and features of the invention will become more readily apparent from a detailed description thereof taken in conjunction with drawings in which.

Figure 1:
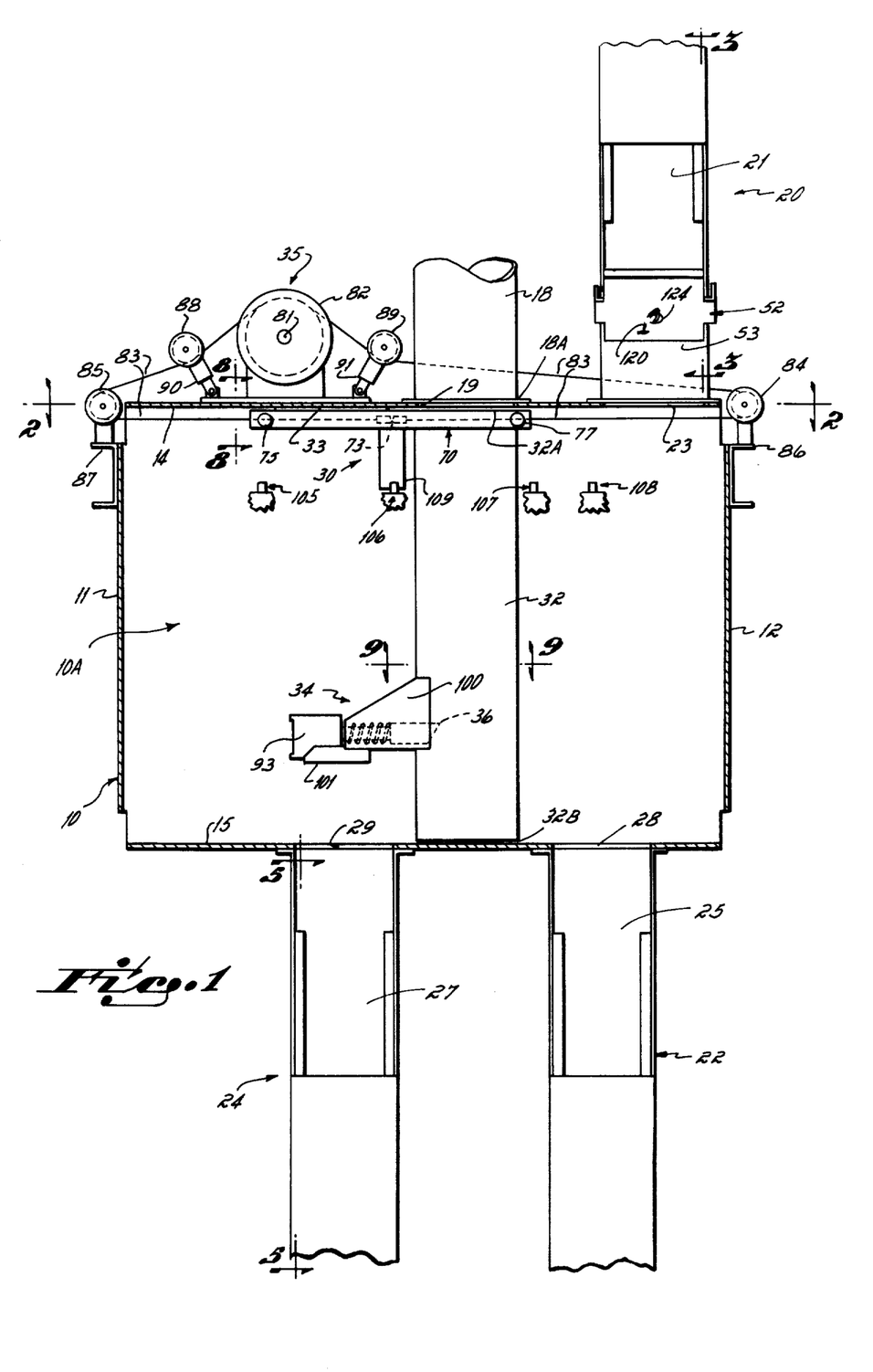
FIG. 1 is a front elevational view, partially in cross-section, showing a first preferred embodiment of the pneumatic carrier terminal of this invention which is adapted to connect at the top thereof to a single system carrier-conveying pneumatic tube for receiving incoming carriers in a downward direction and transmitting outgoing carriers in an upward direction.
Figure 17:
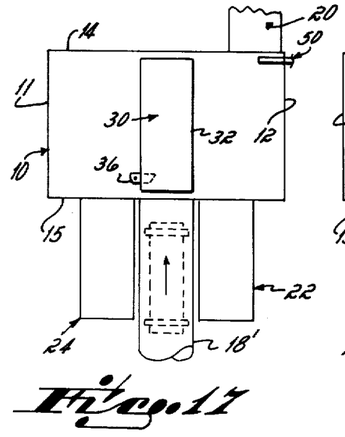
FIGS. 17-19 are schematic elevational views of a second preferred embodiment of the invention, which is designed to receive incoming carriers moving in an upward direction and outgoing carriers moving in a downward direction.
Figure 18:
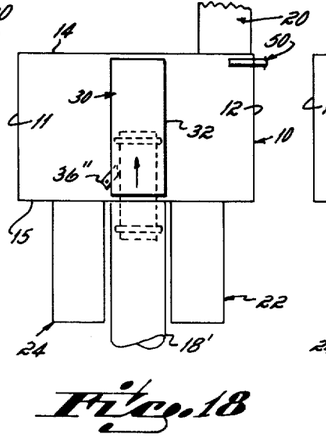
Figure 19:
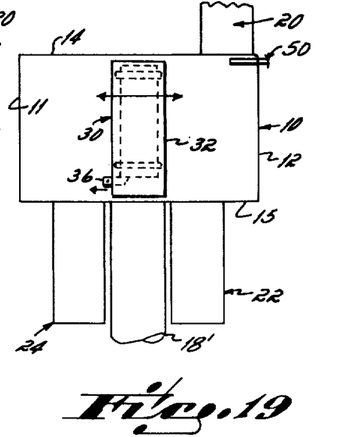

With reference to FIG. 1, one preferred form of the pneumatic carrier terminal of the invention is depicted, namely, a terminal designed to cooperate with a single pneumatic carrier system tube 18 which connects to the upper surface of the terminal housing 10 and through which incoming carriers move in a vertically downward direction and outgoing carriers move in a vertically upward direction. A terminal of the type shown in FIG. 1, and in FIGS. 2-16, which connects to the lower end of a system tube, is termed an "up-send/down-receive" terminal. With very slight modifications, to be discussed in detail hereafter, the terminal depicted in FIG. 1, as well as in FIGS. 2-16, can be adapted to cooperate with a system tube at its top through which incoming carriers enter the terminal 10 moving in a vertically upward direction and outgoing carriers leave the terminal moving in a vertically downward direction. This latter type of terminal is termed a "down-send/up-receive" terminal, and is depicted in FIGS. 17-19.

Figure 8:
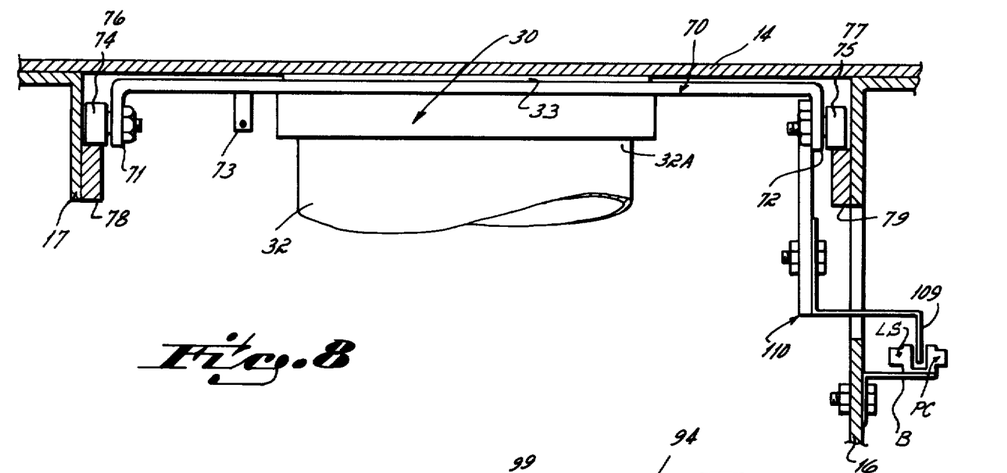
FIG. 8 is a cross-sectional view taken along line 8—8 of FIG. 1.

As shown in FIG. 1, the up-send/down-receive terminal includes a housing 10 which is generally box-like in form, having horizontally spaced apart vertical parallel left and right side walls 11 and 12, vertically spaced horizontally disposed ceiling and floor 14 and 15, and horizontally spaced vertically disposed front and rear walls 16 and 17 (FIG. 8). A single pneumatic carrier transporting tube 18 is mounted such that its lower open end 18A communicates with an aperture 19 in the housing ceiling 14. Incoming carriers moving vertically downwardly in the system tube 18, as well as outgoing carriers moving upwardly in a vertical direction in the system tube 18, move between the interior 10A of the housing and the system tube 18 via the opening 19 in the housing ceiling 14 and open end 18A in the tube 18.

Also associated with housing 10 are three carrier hoppers 20, 22 and 24. Hopper 20 is designed to receive and store multiple carriers manually inserted therein through an opening 21 for subsequent serial transmission from the terminal 10 through the system tube 18 to a distant station. The send hopper 20 has an opening in the bottom thereof which overlies an opening 23 in the housing ceiling 14 for facilitating downward movement of a carrier from the interior of the hopper 20 into the housing interior 10A for subsequent transfer to the system tube 18 in a manner to be described. The hopper 22 is designed to store active carriers received at terminal 10 via system tube 18 from a distant station until such time as the terminal attendant manually removes them via an opening 25. By the term "active carrier" is meant a carrier which contains a payload such as documents, money or the like. The carrier hopper 24 is designed to store inactive carriers which have been transmitted to the terminal 10 via system tube 18 until such time as the terminal attendant manually removes them via an opening 27. By the term "inactive carrier" is meant a carrier which does not contain any payload, that is, an empty carrier. Both hoppers 22 and 24 communicate with the terminal housing interior 10A via suitably disposed openings 28 and 29 provided in the floor 15 of the terminal housing 10.

To facilitate transfer of carriers between the system tube 18 and various hoppers 20, 22 and 24, a horizontally movable shuttle assembly 30 is provided. The shuttle assembly includes, among other things, a vertically disposed carrier transfer tube 32 open at its upper and lower ends 32A and 32B. To facilitate transmission, receipt and storage of carriers, the transfer tube 32 is selectively driven by a shuttle drive assembly 35 between positions underlying the system tube 18 (FIG. 12) and the send hopper 20 (FIG. 14), overlying the active carrier hopper 22 (FIG. 13) and inactive hopper 24 (FIG. 16), and an intermediate position (FIG. 11) in which a closure 33 associated with the transfer tube 32 seals the end 18A of the system tube 18. The shuttle assembly 30 also includes a selectively releasable carrier detent assembly 34 for holding carriers in the transfer tube 32 until such time as release to one or the other of the underlying hoppers 22 or 24 is desired.

The send hopper 20, considered in greater detail, includes a housing having a rear vertical wall 40, spaced apart parallel vertically disposed side walls 41, 42, an angulated ceiling 43A, 43B, and a front wall 44. An opening 21 through which carriers are inserted for storage in the send hopper 20 is provided. An opening 39 in the bottom of the send hopper 20 overlies the opening 23 in the ceiling 14 of the terminal housing 10. Carriers inserted into the send hopper 20 via the opening 21 are stored therein until selectively released, in a manner to be described, whereupon the carrier drops vertically through the hopper bottom opening 39 and the terminal housing ceiling opening 23 into the transfer tube 32 which has previously been positioned to underlie the openings 23 and 39.

Carrier supports 45, 46 are secured to the inside surfaces of send hopper side walls 41 and 42, respectively. The carrier supports are in the form of plates having upper edges 45A and 46A, respectively, which are inclined at an angle of approximately 45° in a downward and rearward direction. The spacing between the upper edges 45A and 46A of carrier support plates 45 and 46 is selected such that they underlie diametrically opposed edges of the upper radially extending shoulder 47 formed on the carriers 48. The spacing between walls 41 and 42 is greater than the diameter of carrier shoulder 47. With the spacing of the edges 45A and 46A and walls 41 and 42 so selected relative to the diameter of the carrier shoulder 47, carriers inserted into the send hopper 20 via the opening 21 are supported in a generally vertical disposition with the carrier body located between the plates 45 and 46 and with diametrically opposed portions of carrier shoulder 47 overlying and supported by upper plate edges 45A and 46A.

As noted, edges 45A and 46A of carrier support plates 45 and 46 are downwardly and rearwardly inclined. As a consequence, carriers supported thereby will slide downwardly and rearwardly under the force of gravity.

The carrier support plates 45 and 46 also each have vertically disposed rear edges 45B and 46B. Edges 45B and 46B in combination with vertically disposed rear wall 40 and side walls 41 and 42 of the send hopper 20 serve to guide the upper circular shoulder 47, and hence the carrier 48, in a generally downward vertical direction after the carrier shoulder 47 has slid downwardly and rearwardly along edges 45A and 46A beyond the corners 45C and 46C of the carrier support plates 45 and 46.

Figures 2, 3, 3A, 4:
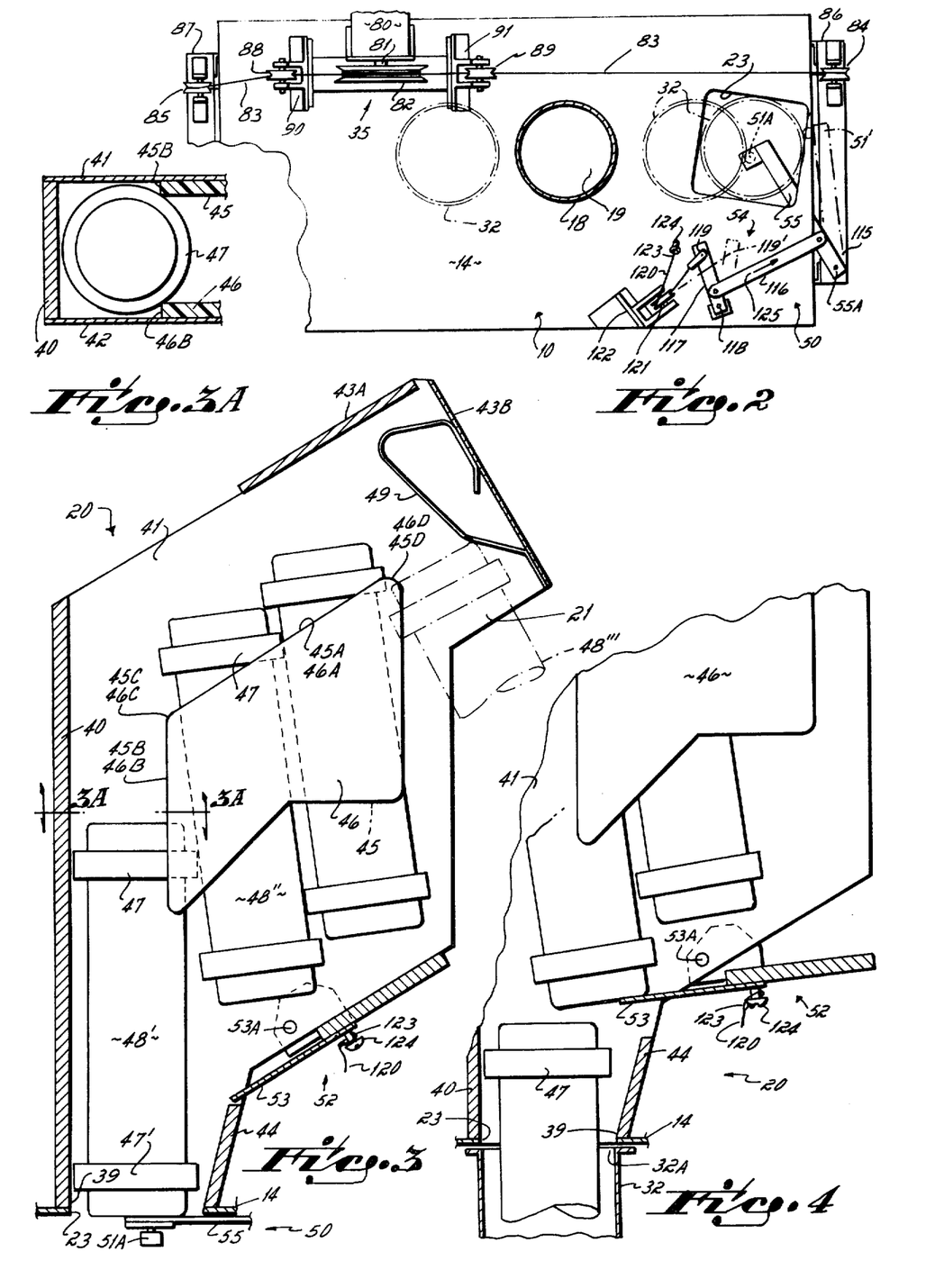
FIG. 2 is a cross-sectional view taken along line 2—2 of FIG. 1.
FIG. 3 is a cross-sectional view taken along line 3—3 of FIG. 1.
FIG. 3A is a cross-sectional view taken along line 3A—3A of FIG. 3.
FIG. 4 is a vertical cross-sectional view of a portion of the carrier send hopper depicted in FIG. 3, showing a carrier in the process of leaving the hopper.

A leaf spring 49 secured to the interior of the front wall 43B releasably restricts the opening between the upper forward corners 45D, 46D of the carrier support plates 45 and 46 and the front wall 43B. Carriers inserted into the hopper 20 via the opening 21 have their upper end biased in a downward and rearward direction by spring 49. This insures that the upper circular shoulder 47 of an inserted carrier engages the upper edges 45A, 46A of the carrier support plates 45 and 46 upon insertion of the carrier into the hopper. Thus, as a carrier, such as carrier 48′, is inserted into the opening 21 of the send hopper 20 it slides against corners 45D and 46D, pushing the leaf spring 49 upwardly. Once the shoulder 47 has passed above the corners 45D and 46D the leaf spring 49 returns to its normal position, pushing the carrier leftwardly (FIG. 3) beyond the corners 45D and 46D, causing the carrier shoulder to slide down along edges 45A and 46A until the carrier is stopped by a previously inserted carrier, if any. Associated with the send hopper 20 is a selectively operable carrier release assembly 50 and a selectively operable carrier hold assembly 52. These assemblies will be described in greater detail hereafter. However, at this time it is noted that the carrier release assembly 50 has a detent 51 which normally underlies the lowermost end of the innermost carrier 48' in the send hopper 20, preventing the innermost carrier 48' from moving downwardly through the hopper bottom opening 39 into the housing interior 10A via opening 23 in the housing ceiling. Associated with the detent 51 of the carrier release assembly 50 is a cam follower 51A, which engages the upper end 32A of the transfer tube 32 when the latter moves to a position underlying the send hopper opening 39, to laterally displace the detent 51 to a position 51' (FIG. 2) wherein the detent no longer underlies the innermost carrier 48' in the send hopper 20. When the detent 51 is in position 51', the innermost carrier 48' is free to drop through the openings 39 and 23 into the underlying transfer tube 32. The carrier hold assembly 52 includes a flap 53 mounted for pivotal movement about pivot mount 53A. Flap 53, through a suitable cord, pulley and linkage assembly 54, pivots from a downward position (FIG. 3) to an upward position (FIG. 4) when the transfer tube 32 cams the detent 51 of the carrier release assembly 50 to its laterally displaced position 51' (FIG. 2). With the carrier hold flap 53 in its upward position (FIG. 4), the second innermost carrier 48" in the send hopper 20 is engaged at its lower end by the flap and prevented from moving downwardly under the force of gravity when the innermost carrier 48' moves through openings 39 and 23 under the force of gravity into the underlying transfer tube 32.

The structure and operation of the active carrier hopper 22 and the inactive carrier hopper 24 are identical. Accordingly, only the structure and operation of the inactive carrier 24 is described in detail. The inactive hopper 24 includes a rear wall 60, an upper wall or ceiling 61, a downwardly and forwardly angulated bottom 62, an upwardly and outwardly angulated front wall 63 having opening 27 therein for convenient removal of carriers 65, 65', . . . stored in the hopper, and vertically disposed horizontally spaced apart side walls 64, 64. The rear portion of the interior of the inactive hopper 24 underlies the opening 29 in the floor of the terminal housing 15 such that when the transfer tube 32 having a carrier therein is laterally positioned overlying the opening 29 the carrier within the transfer tube 32 will fall vertically downwardly under the force of gravity into the rear portion of the interior of the inactive hopper 24.

Figures 5, 6, 7:
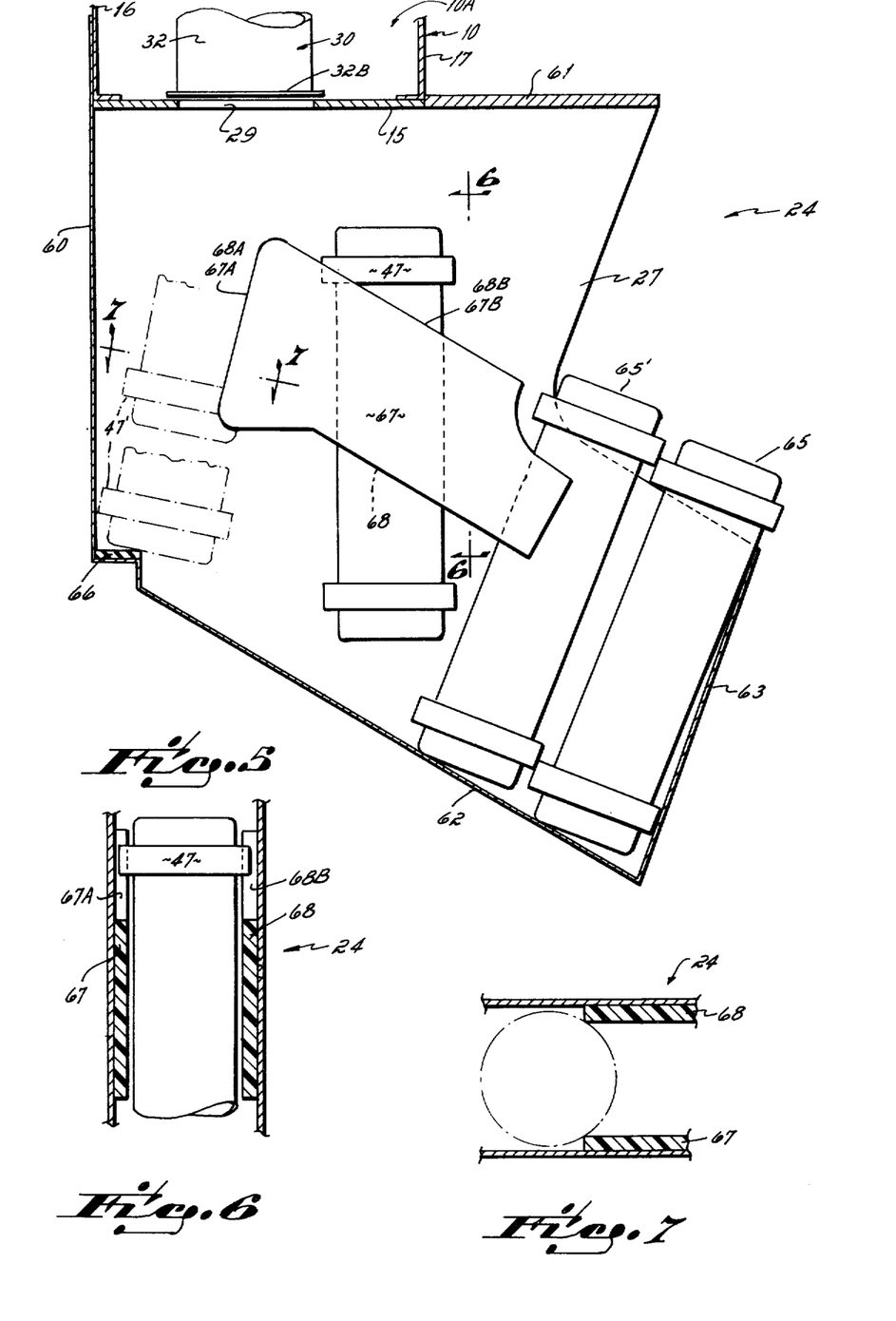
FIG. 5 is a cross-sectional view taken along line 5—5 of FIG. 1.
FIG. 6 is a cross-sectional view taken along line 6—6 of FIG. 5.
FIG. 7 is a cross-sectional view taken along line 7—7 of FIG. 5.

To facilitate orderly placement for storage of inactive carriers delivered to the hopper 24 by the transfer tube 32 when it overlies the opening 29, a bumper or cushion 66 is provided along with a pair of carrier support plates 67 and 68. The carrier support plates 67 and 68 are secured to the interior surfaces of hopper side walls 64, and are provided with downwardly and rearwardly disposed carrier guiding edges 67A and 68A, respectively, and downwardly and forwardly disposed carrier guiding edges 67B and 68B, respectively. The downwardly and rearwardly disposed edges 67A and 68A of the carrier support plate 67 and 68 engage the circular shoulder 47' on the lower leading end of a downwardly moving carrier entering the interior of the hopper 24 via the opening 29 (FIG. 7) and guide the lower leading end of the carrier in a slightly rearward direction such that the bottom leading end thereof strikes the cushion 66 located at the junction of the rear hopper wall 60 and the hopper bottom 62. At the point in time when the bottommost leading end of the downwardly moving carrier strikes the cushion 66 the carrier is angled slightly forwardly such that under the force of gravity the upper end of the carrier pivots forwardly (rightwardly as viewed in FIG. 5). As the upper end of the carrier whose bottom end is seated on the bumper 66 pivots rightwardly as viewed in FIG. 5, the body of the carrier located between the upper and lower circular shoulders 47 and 47', which is of lesser diameter than the shoulders, guides between the guide plates 67 and 68. Further pivotal movement of the carrier whose bottom end seats on the cushion 66 eventually results in the upper circular shoulder 47 of the carrier seating on the guiding edges 67B and 68B of the plate 67 and 68. Once the upper circular shoulder 47 of the carrier seats on the guide edges 67B and 68B of the plates 67 and 68, the carrier moves under the force of gravity in a forward and downward direction as the upper shoulder of the carrier slides along the downwardly and forwardly inclined guiding edges 67B and 68B. A carrier sliding down guide edges 67B and 68B will move to the position of carrier 65 adjacent the hopper front wall 63 if the hopper is empty. If the hopper has already stored therein a single carrier, such as carrier 65, a carrier sliding down guide edges 67B and 68B will assume the position of carrier 65'. With a hopper sized as shown in FIG. 5, up to a maximum of four carriers can be stored in the hopper. The number of carriers stored in the hopper, of course, can be varied depending upon the size of the hopper.

As noted, the active carrier hopper 22 is constructed identically to the inactive carrier hopper 24. An incoming carrier entering the terminal housing 10 via the system tube 18 can be selectively delivered by the transfer tube 32 to either the active carrier hopper 22 or the inactive carrier hopper 24 depending upon whether the carrier contains a payload or is empty.

The shuttle assembly 30, as discussed briefly hereinbefore, includes a transfer tube 32 which is selectively laterally positionable via shuttle drive assembly 35 to different positions. These positions include positions overlying the active carrier hopper 22 (FIG. 13) and inactive carrier hoppers 24 (FIG. 16) for delivery of active and inactive carriers to these hoppers. The transfer tube 32 is also selectively positionable to a position underlying system tube 18 (FIG. 12) for receiving an incoming carrier for transfer to one or the other of the hoppers 22 or 24. The transfer tube 32 is positionable to a position underlying the send hopper 20 (FIG. 14) for receiving therefrom an outgoing carrier which has been inserted into the hopper and which, when the transfer tube containing the outgoing carrier is positioned to underlie the system tube 18 (FIG. 15), will facilitate transmission of the carrier from the terminal via the system tube. Finally, the transfer tube 32 is selectively positionable to an intermediate position (FIG. 11) in which the laterally extending closure 33 seals the lower end of the system tube 18 to facilitate air-cushion braking or deceleration of an incoming carrier moving vertically downwardly in the system tube 18. When the transfer tube 32 is in the intermediate position of FIG. 11 the cam follower 51A is not engaged by the upper end of the transfer tube and hence the detent 51 of the carrier release assembly remains in its normal position underlying the innermost carrier 48' in the send hopper, preventing release of the carrier.

The shuttle assembly 30 includes a horizontally disposed upper frame member 70 having downwardly depending flanges 71 and 72. The frame member 70 is disposed below and horizontal to the housing ceiling 14 spanning the front and rear housing wall 16 and 17 with the flanges 71 and 72 spaced slightly from the front and rear housing walls. Guide rollers 74 and 76 are mounted at opposite ends of the downwardly depending flange 71 via suitable fasteners for rotation about a horizontal axis. Mounted at opposite ends of the flange 72 for rotation about horizontal axes are guide rollers 75 and 77. Guide bars 78 and 79 disposed horizontally are secured to the nside surfaces of the rear wall 17 and front wall 16, respectively. Guide rollers 74 and 76 mounted to the flange 71 roll on guide bar 78, while guide rolls 75 and 77 mounted to the front flange 72 roll on guide bar 79. The frame member 70 is provided with a suitable aperture which is aligned and coextensive with the interior of the transfer tube 32. The upper end of the transfer tube 32 is spaced close to the bottom surface of the housing ceiling 14 such that when the tube 32 underlies the system tube 18 and the send hopper 20, downwardly moving carriers will smoothly enter the transfer tube 32.

The shuttle drive assembly 35, which bidirectionally shifts the transfer tube 32 between the various positions heretofore described, includes a motor 80 mounted to the housing ceiling 14 having a horizontally disposed drive shaft 81 to which a pulley 82 is fixedly secured. A cable 83 is wrapped around the pulley to facilitate friction drive of the cable in opposite directions when the motor 80 is bidirectionally driven. The cable 83 also trains around a pair of idler pulleys 84 and 85 rotatably secured to the terminal housing side walls 12 and 11 by brackets 86 and 87. A pair of idler pulleys 88 and 89 secured to the terminal ceiling 14 by telescoping tension mounts 90 and 91 engage the cable 83 on either side of the motor driven pulley 82 to maintain proper tension on the cable. The horizontal run of the cable 83 is secured to the frame 70 at 73. When the motor is bidirectionally driven the frame 70, and hence the transfer tube 32, is bidirectionally driven via the drive connection 73 between the cable 83 and the frame 70.

Figure 9:
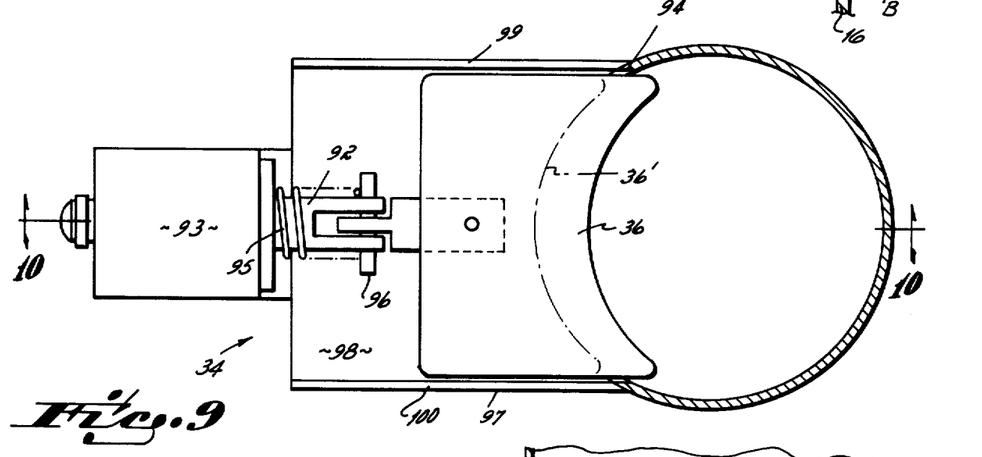
FIG. 9 is a cross-sectional view taken along line 9—9 of FIG. 1.

The carrier detent assembly 34, which functions to hold a carrier in the transfer tube 32 until such time as it is desired to release it for downward movement to the active hopper 22 or inactive hopper 24, or into the system tube 18' in the up-receive/down-send embodiment depicted in FIGS. 17-19, includes a horizontally reciprocable detent 36 which at its inner end is pivotally connected with a pin 96 to the plunger 92 of a solenoid 93. When the solenoid 93 is de-energized, which is its normal condition, the detent 36 projects through an opening 94 in the transfer tube 32 into the interior of the transfer tube, preventing release of a carrier stored therein. When the solenoid 93 is energized and its plunger 92 retracted leftwardly as viewed in FIG. 10, the detent 36 moves horizontally to the left to a position with its outer end flush with the interior of the transfer tube wall, releasing a carrier stored therein for downward travel under the force of gravity into either the active hopper 22, the inactive hopper 24, or in the up-receive/down-send embodiment of FIGS. 17-19 into the system tube 18' for transmission to a remote station. The detent 36 has a generally arcuate configuration as shown in FIG. 9, and when in its retracted position assumes the phantom line position 36'.

A compression spring 95 encircling the solenoid plunger 92 between the solenoid 93 and the pivot pin 96 normally maintains the detent 36 in its extended position projecting into the interior of the transfer tube 32. A bracket 97 having a horizontally disposed bottom 98 and a pair of vertically disposed sides 99 and 100 is secured at its inner end to the exterior wall of the transfer tube 32 for guiding the detent 36 between its retracted and extended positions. A horizontally extending plate 101 secured to the bottom of the bracket plate 98 via a spacer 102 mounts the solenoid 93.

In the up-send/down-receive embodiment depicted in FIGS. 1-16 the detent 36 moves only in a horizontal direction between its retracted and extended position 36' and 36, respectively. When the transfer tube 32 underlies the send hopper 20 a released carrier descending into the tube 32 has its downward movement stopped by the detent 36 which is in its extended position. When the transfer tube containing a carrier is positioned to underlie the system tube 18 the carrier moves upwardly into the system tube 18 for transmission. In the up-send/down-receive embodiment depicted in FIGS. 1-16, movement of the outgoing carrier from the transfer tube 32 into the system tube 18 does not require that the detent 36 be moved to its retracted position 36'. However, in the up-receive/down-send embodiment depicted in FIGS. 17-19, a carrier which has entered the transfer tube 32 from the send hopper 20 can only be transferred to the system tube 18' for transmission to a remote station by retraction of the detent 36 to its phantom line position 36'.

When an incoming carrier is arriving in the system tube 18 in the up-send/down-receive embodiment of FIGS. 1-16, the carrier descends into the tranfer tube 32 until its bottom end abuts the detent 36 which is in its extended position. When the transfer tube 32 is then moved to overlie the active carrier hopper 22 or the inactive carrier hopper 24, the detent is then moved to its retracted position 36' by energization of the solenoid 93 whereupon the carrier falls downwardly into either the active carrier or the inactive carrier hopper, as the case may be.

In the up-receive/down-send embodiment of FIGS. 17-19 when an incoming carrier is received the carrier is moving upwardly in the system tube 18' and enters the overlying transfer tube 32. As the incoming carrier moves upwardly in the transfer tube 32 the detent 36 momentarily pivots to the phantom line position 36" shown in FIG. 10. The incoming carrier continues moving upwardly until its lower end is positioned above the detent, whereupon the detent moves from its upward pivoted position 36" to its normal extended position 36. The received carrier then settles back down under the force of gravity, with its lower end seating on the detent 36. The received carrier in the transfer tube 32 is released to an underlying active carrier 22 or inactive carrier hopper 24, as the case may be, by laterally shifting the transfer tube to overlie the appropriate hopper and energizing the solenoid 93 to move the detent to the retracted position 36' whereupon the carrier falls under the force of gravity downwardly into the appropriate underlying hopper.

To facilitate positioning of the transfer tube 32 in the various positions heretofore described for receiving incoming carriers, sending outgoing carriers, and/or depositing incoming carriers into one or the other of the active carrier or inactive carrier hoppers 22 or 24, a plurality of phototransducer assemblies 105, 106, 107 and 108 are provided. Each of the phototransducer assemblies includes a light source LS and photocell PC which are spaced slightly apart and mounted on a suitable bracket B secured to the front wall 16 of the terminal housing 10. A flag 109 depending downwardly from an L-shaped bracket 110 secured at its upper end to frame flange 72 moves with the transfer tube 32 along a horizontal path parallel to the terminal front wall 16 between the light sources LS and photocells PC of the various phototransducer assemblies 105, 106, 107 and 108. The phototransducer assemblies 105-108 are positioned such that their respective light beams are interrupted by the flag 109 when the transfer tube 32 overlies or underlies the various hoppers 20, 22, 24 and system tubes 18 or 18', as the case may be, or is placed in the intermediate position of FIG. 11 in which the closure 33 seals the bottom of system tube 18 to facilitate carrier receipt in the up-send/down-receive embodiment of FIGS. 1-16. In this way, electrical signals are produced by different ones of the phototransducer assemblies 105-108 reflecting the position of the transfer tube throughout the various phases of transfer tube movement. These electrical signals can be used in a well-known manner to control the motor 80 and hence the position of the transfer tube 32.

The carrier release assembly 50 associated with the send hopper 20, as noted previously, includes a detent 51. Detent 51 is selectively positionable, by engagement of cam follower 51A with the upper end of the laterally shiftable transfer tube 32, between a) a position underlying the innermost carrier 48' in the send hopper 20, restraining downward movement of the carrier and b) a position 51' displaced laterally of the send hopper opening 39, permitting the innermost carrier 48' in the send hopper to move downwardly under the force of gravity. The carrier hold assembly 52, via a cord, pulley and linkage assembly 54, moves in coordinated fashion with respect to the movement of the detent 51 of the carrier release assembly 50 such that when the detent 51' is in the release position 51' (FIG. 2) allowing the innermost carrier 48' in the send hopper 20 to drop into the transfer tube 32, the carrier holding flap 53 is pivoted to its upward position 53', restraining downward movement of the second innermost carrier 48''.

The carrier release assembly 50 includes a horizontally disposed link 55. Link 55 is pivotally mounted at its one end by a vertical pin 55A to a bracket 115 secured to the terminal housing side wall 12. The other end of the lever 55 constitutes the detent 51 which selectively underlies the innermost carrier 48'. As noted previously, a cam follower 51A is secured to the lever 55 proximate the detent such that as the transfer tube 32 moves rightwardly (as viewed in FIG. 2) to underlie the send hopper it will engage the cam follower 51A and shift the detent 51 of the lever 55 to the release position 51'.

The cord, pulley and linkage assembly 54, which coordinates the motion of the carrier hold flap 53 and the detent 51, includes a link 116 connected at one end to the link 55 and at the other end to a second link 117. Link 117 is mounted to a stationary pivot 118 at one end and at its other end is connected to one end 119 of a cable 120. Cable 120 trains under a pulley 121 mounted for rotation on a bracket 122 secured to the housing ceiling 14. The other end 123 of the cable 120 is connected to a tab 124 secured to the undersurface of the flap 53. When the transfer tube 32 moves to a position underlying the send hopper 20, the cam follower 51A engages the upper end of the transfer tube 32 and positions the detent 51 to the laterally displaced position 51', enabling the innermost carrier 48' in the hopper 20 to drop under the force of gravity into the transfer tube 32 which underlies it. In addition, when the detent 51 moves to the position 51', the lever 55 pivots clockwise about its mount 55A (FIG. 2). Clockwise pivoting of lever 55 moves link 116 in the direction of arrow 125 which in turn pivots link 117 clockwise about its mounting pin 118. Clockwise movement of the link 117 repositions the cable end 119 to the phantom line position 119' in turn tensioning the cable 120. As the cable 120 is tensionsed, flap 53 pivots clockwise about its mounting end 53A from the position shown in FIG. 3 to the position shown in FIG. 4. With the flap positioned as shown in FIG. 4, the second innermost carrier 48'' is restrained from moving downwardly under the force of gravity when the innermost carrier 48' is released by the now laterally displaced detent 51 and moves downwardly into the transfer tube 32 which underlies it. When the transfer tube 32, which now contains a carrier, moves leftwardly (FIG. 2) to either the carrier receive position underlying or overlying the system tube 18 or 18', as the case may be, or to a position overlying the inactive discharge hopper 24, the detent 51 returns to a position underlying the send hopper thereby preventing the next carrier 48'' from falling downwardly into the terminal. At the same time, the carrier flap 53 returns to its normal position depicted in FIG. 3.

Figure 11:
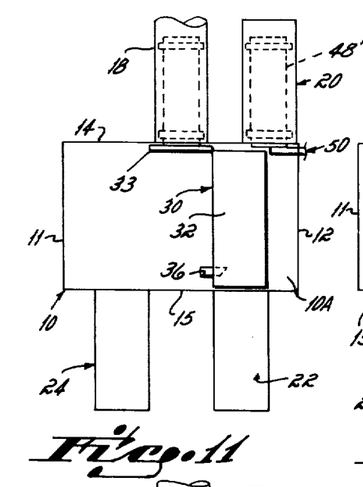
FIGS. 11-16 are schematic elevational views of the preferred embodiment of the invention depicted in FIGS. 1-10, showing the varying positions of the transfer tube and carriers during typical carrier send, receive and store operations.
Figures 12, 13:
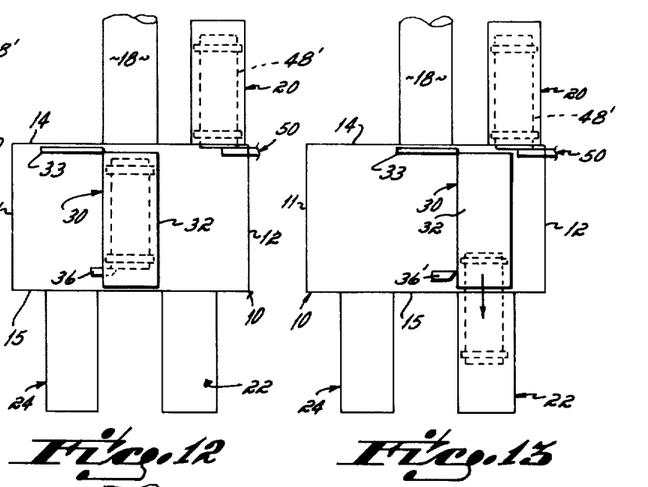

With reference to FIGS. 11-16, the operation of the up-send/down-receive embodiment will be described. In the normal or standby position depicted in FIG. 11, the transfer tube 32 is in a position intermediate the send hopper 20 and system tube 18 such that the closure 33 which moves with the transfer tube 32 underlies and seals the lower open end of the system tube. An incoming carrier moving downwardly in the system tube 18 will be braked due to the air cushion which exists between the closure 33 and the arriving carrier. When the carrier has come to rest atop the closure 33 the transfer tube 32 moves to a position underlying the system tube 18 (FIG. 12). The incoming carrier then drops under the force of gravity into the carrier transfer tube until its lower end abuts the detent 36 which is in its normal extended position. The carrier which has arrived is now stored in the transfer tube 32 with its lower end seated on the extended detent 36.

When the transfer tube 32 is in the position shown in FIG. 11 awaiting receipt of a carrier in the system tube 18, the cam follower 51A attached to the detent 51 of the carrier release assembly 50 is not engaged with the upper end of the transfer tube 32. As a consequence, the detent 51 of the carrier release assembly 50 underlies the innermost carrier 48' in the send hopper. When the transfer tube 32 moves from the carrier awaiting position (FIG. 11) to the carrier pick-up position (FIG. 12), the innermost carrier 48' in the send hopper 20 does not fall into the terminal interior 10A under the force of gravity.

With the incoming carrier located in the transfer tube 32 (FIG. 12) the carrier can be delivered to either the active carrier hopper 22 or the inactive carrier hopper 24, as desired. If the incoming carrier temporarily stored in transfer tube 32 is to be transferred to the inactive carrier hopper 24, the transfer tube is moved leftwardly from the position shown in FIG. 12 to the position shown in FIG. 16. When the carrier transfer tube 32 has reached a position overlying the opening 29 of the inactive hopper 24, the solenoid 93 is energized to retract the detent 36 to the position 36' whereupon the carrier in the transfer tube falls vertically downwardly under the force of gravity into a suitable storage position in the manner described previously in connection with FIGS. 5–7.

If a received carrier temporarily stored in the transfer tube 32 is to be placed in the active hopper 22, the transfer tube is moved from the position shown in FIG. 12 to the position of FIG. 13 overlying the opening 28 in the floor of the terminal housing above the active carrier hopper 22. With the carrier transfer tube 32 in the position shown in FIG. 13, the solenoid 93 is energized and the detent moved from its normal extended position 36 to its retracted position 36' whereupon the carrier moves downwardly from the transfer tube 32 into the active carrier hopper 22 to assume a storage position in much the same manner as described in connection with the inactive carrier hopper of FIGS. 5–7. When the transfer tube 32 overlies the active carrier hopper 22, the detent 51 underlies the send hopper opening 39 to prevent release of the innermost carrier 48' in the send hopper, since the upper end of the transfer tube 32 has not yet traveled sufficiently in a rightward direction to engage cam 51A and move the detent to the 51' position.

Figure 14:
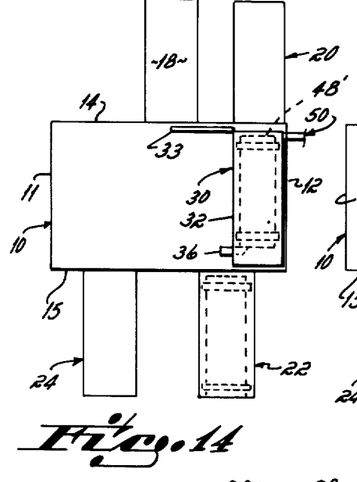
Figures 15, 16:
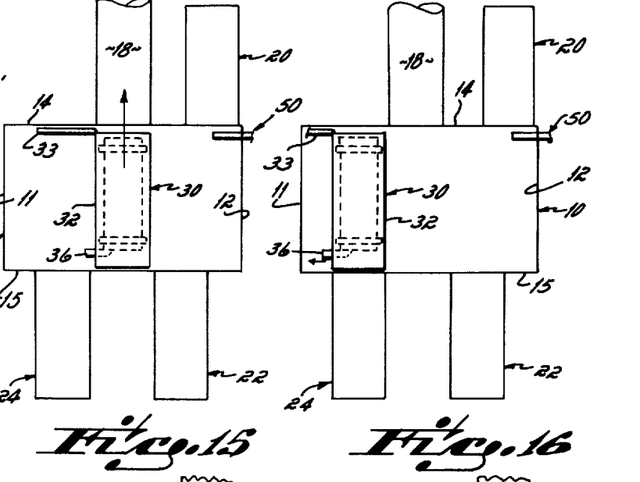

When it is desired to send a carrier to a remote station, the transfer tube 32 moves to the position shown in FIG. 14 wherein the upper end of the transfer tube is aligned with the opening 39 in the bottom of the send hopper 20. As described previously, when the transfer tube 32 is moved to a position underlying the opening 39 of the send hopper 20, the carrier release detent 51 is cammed to the laterally displaced position 51' (FIG. 2) and the flap 53 is placed in its upper position (FIG. 4), enabling the innermost carrier 48' in the send hopper 20 to fall vertically downwardly under the force of gravity into the carrier transfer tube to a position atop the extended detent 36. The transfer tube, with the carrier stored in it, is then positioned to underlie the system tube 18. The system tube is then placed in a vacuum mode and the outgoing carrier drawn into the system tube for transmission to the remote station.

In the up-receive/down-send embodiment depicted in FIGS. 17–19, a received carrier temporarily stored in the transfer tube 32 atop the extended detent 36 is delivered to the active carrier hopper 22 or the inactive hopper 24 in a manner identical to that described in connection with the up-send/down-receive embodiment described in FIGS. 1–16. That is, the carrier transfer tube 32, with the received carrier stored therein atop the extended detent 36, is moved to a position overlying one or the other of the hoppers 22 or 24 and the solenoid 93 energized to retract the detent to the position 36' whereupon the carrier falls under the force of gravity into the underlying hopper. Similarly, delivery of a carrier from the send hopper 20 to the carrier transfer tube 32 in the up-receive/down-send embodiment is identical to that in the up-send/down-receive embodiment. Specifically, the transfer tube 32 is moved to a position underlying the send hopper 20 whereupon the carrier release assembly allows the innermost carrier 48' therein to move downwardly into the underlying carrier transfer tube while the flap 53 in its upper position 53' prevents the second innermost carrier 48" from falling downwardly under the force of gravity.

Figure 10:
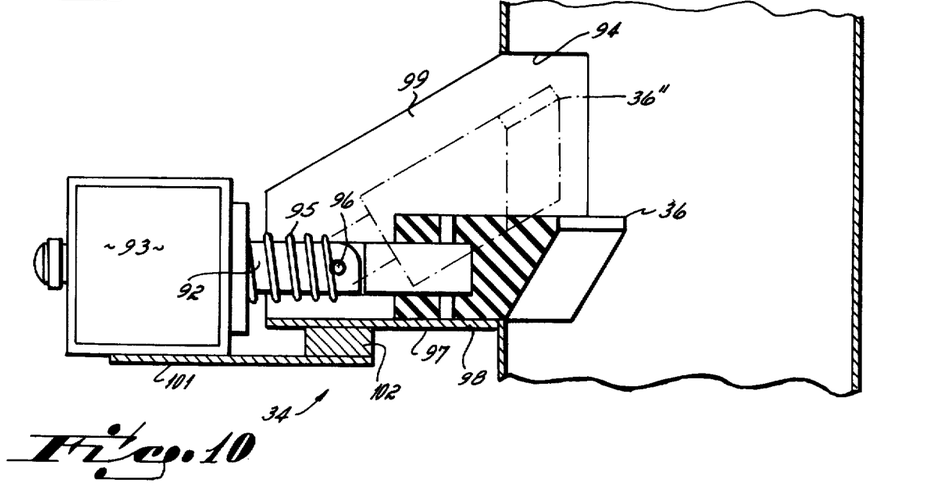
FIG. 10 is a cross-sectional view taken along line 10—10 of FIG. 9.

Receipt of incoming carriers and transmission of outgoing carriers in the up-receive/down-send embodiment of FIGS. 17–19 is different from that described in connection with the up-send/down-receive embodiment of FIGS. 1–16. Specifically, to receive an incoming carrier moving upwardly in the system tube 18' the transfer tube 32 is moved to a position to directly overlie the system tube 18' (FIG. 17). The incoming carrier moves upwardly into the carrier transfer tube 32 in the course of which the detent 36 associated with the carrier transfer tube momentarily pivots upwardly to the position 36" (FIGS. 10 and 18). When the lower end of the incoming carrier advances to a position above the detent 36, the detent returns to its normal extended position supporting the receive carrier in the transfer tube 32 (FIG. 19). The receive carrier can be delivered to either of the hoppers 20 or 24 by aligning the transfer tube in overlying relationship with respect to the desired hopper and energizing the solenoid 93 to retract the detent 36 and release the received carrier for downward movement into the underlying hopper. To send a carrier to a remote station, which has been delivered to the carrier transfer tube from the storage hopper 20 in the manner described previously, the transfer tube is moved to the position overlying the system tube 18' (FIG. 19). When this has been done the solenoid 93 is energized to move the carrier detent to its retracted position 36' (FIG. 9), whereupon the carrier falls downwardly under the force of gravity into the system tube 18' which, of course, has been placed under vacuum to transport the carrier to a distant station.

Significantly, and with very little modification, the terminal of this invention can be used in either the up-receive/down-send mode in which the system tube 18' connects to the floor of the terminal housing, or in an up-send/down-receive configuration in which the system tube 18 connects to the ceiling of the carrier. This enhances the versatility of the terminal with very little additional cost.

To energize the motor 80 and the solenoid 93 at the appropriate times as is necessary to shift the transfer tube between its various positions to send, receive and transfer carriers between various hoppers, suitable control circuitry responsive to the phototransducers 104–108 is provided in accordance with techniques well-known in the art and hence not described in detail herein.

We claim:

1. A terminal for a pneumatic tube system connectable to a carrier-conveying tube through which carriers move in opposite directions in transit to and from the terminal, comprising:

a send hopper into which a plurality of carriers can be sequentially inserted for temporary storage prior to sequential transmission from said terminal via said carrier-conveying tube, said send hopper including
 a. a pair of elongated downwardly and rearwardly inclined spaced parallel carrier guides for supporting therebetween in vertical disposition a plurality of carriers to facilitate gravity-induced sliding movement of said carriers in a downward and rearward direction from a carrier-entrance end to a carrier-exit end, with said exit end being lower than said entrance end, and b. a carrier release assembly mounted proximate said exit end for selectively releasing carriers from said send hopper on a sequential basis whereupon said released carriers move downwardly under the force of gravity, a vertically disposed transfer tube open at its upper and lower ends for receiving and temporarily storing a carrier, said transfer tube having a selectively releasable detent for supporting a carrier in said transfer tube, a first received-carrier hopper for temporarily storing a plurality of received carriers sequentially transmitted to said terminal via said carrier-conveying tube, said first received-carrier hopper including a. a pair of elongated downwardly and forwardly inclined spaced parallel carrier guides for supporting therebetween in vertical disposition a plurality of carriers to facilitate gravity-induced sliding movement in a downward and forward direction from a carrier-entrance end to a carrier-exit end, with said exit end being lower than said entrance end, a transfer tube mount and drive assembly for reciprocating said transfer tube in a horizontal path between a. a first position in which said upper end of said transfer tube underlies said exit end of said send hopper to receive in said transfer tube for support by said detent a downwardly moving carrier released from said send hopper, b. a second position in which said transfer tube is aligned with said carrier-conveying tube for delivery of a carrier to said carrier-conveying tube for transmission from said terminal and for receiving a carrier from said carrier-conveying tube transmitted to said terminal, and c. a third position in which said lower end of said transfer tube overlies said entrance end of said first received-carrier hopper for downward gravity-induced delivery of a received carrier thereto upon release of said transfer tube detent.

2. The system of claim 1 wherein said upper end of said transfer tube underlies a lower open end of said carrier-conveying tube when said transfer tube is in said second position to facilitate upward transfer of a carrier to said carrier-conveying tube for transmission from said terminal.

3. The system of claim 1 wherein said lower end of said transfer tube overlies an upper open end of said carrier-conveying tube when said transfer tube is in said second position to facilitate downward gravity-induced transfer of a carrier to said carrier-conveying tube for transmission from said terminal upon release of said detent.

4. The system of claim 1 wherein said carrier release assembly includes a cam follower positioned to engage and be displaced by said transfer tube upon movement thereof to said first position, said cam follower being operative upon said displacement to initiate release of a carrier by said carrier release assembly.

5. The system of claim 1 further including:

a second received-carrier hopper for temporarily storing a plurality of received carriers sequentially transmitted to said terminal via said carrier-convying tube, said second received-carrier hopper including a pair of elongated downwardly and forwardly inclined spaced parallel carrier guides for supporting therebetween in vertical disposition a plurality of carriers to facilitate gravity-induced sliding movement in a downward and forward direction from a carrier-entrance end to a carrier-exit end, with said exit end being lower than said entrance end, said second received-carrier hopper being horizontally displaced relative to said first received-carrier hopper, said transfer tube mount and drive assembly reciprocating said transfer tube to a fourth position in which said lower end of said transfer tube overlies said entrance end of said second received-carrier hopper for downward gravity-induced delivery of a received carrier thereto upon release of said transfer tube detent, said transfer tube mount and drive assembly being operative to deliver empty and full carriers to different ones of said first and second received-carrier hoppers.

6. The system of claim 2 further including:

a closure mounted for movement with said transfer tube and positionable proximate said lower open end of said carrier-conveying tube when said transfer tube is in an intermediate position for restricting the flow of air from said carrier-conveying tube to brake and thereafter support in said carrier-conveying tube a received carrier transmitted to said terminal, said transfer tube mount and drive assembly being operative to position said transfer tube in said intermediate position with said closure proximate said lower open end of said caarrier-conveying tube to await receipt of a carrier transmitted to said terminal and upon receipt of a transmitted carrier to brake and support it in said carrier-conveying tube.

7. The system of claim 3 wherein said detent is mounted to said transfer tube for momentary pivotal movement in an upward direction under the action of a received carrier moving upwardly in said transfer tube when in said second position, said detent pivoting downwardly to return to a normal position underlying and supporting said received carrier in said transfer tube upon passage of the lower end of said received carrier above said detent.

8. A terminal for a pneumatic tube system connectable to a carrier-conveying tube through which carriers move in opposite direction in transit to and from the terminal, comprising:

a send hopper into which multiple carriers can be inserted for temporary storage prior to sequential transmission from said terminal via said carrier-conveying tube, said carriers being released in a vertical disposition from said send hopper through a carrier exit in a vertically downward direction under the force of gravity, a vertically disposed transfer tube open at its upper and lower ends for receiving and temporarily storing a carrier, said transfer tube having a selectively releasable detent for supporting a carrier in said transfer tube, a first received-carrier hopper for temporarily storing a plurality of received carriers sequentially transmitted to said terminal via said carrier-conveying tube, said first received-carrier hopper receiving and storing vertically disposed carriers which are delivered to an entrance end thereof in a vertically downward direction, a transfer tube mount and drive assembly for reciprocating said transfer tube in a horizontal path between a. a first position in which said upper end of said transfer tube underlies said exit of said send hopper to receive in said transfer tube for support by said detent a downwardly moving carrier released from said send hopper, a second position in which said transfer tube is aligned with said carrier-conveying tube for delivery of a carrier to said carrier-conveying tube for transmission from said terminal, and for receiving a carrier from said carrier-conveying tube transmitted to said terminal, and c. a third position in which said lower end of said transfer tube overlies said entrance end of said first received-carrier hopper for downward gravity-induced delivery of a received carrier thereto upon release of said transfer tube detent.

9. The system of claim 8 wherein said upper end of said tranfer tube underlies a lower open end of said carrier-conveying tube when said transfer tube is in said second position to facilitate upward transfer of a carrier to said carrier conveying tube for transmission from said terminal.

10. The system of claim 8 wherein said lower end of said transfer tube overlies an upper open end of said carrier-conveying tube when said transfer tube is in said second position to facilitate downward gravity-induced transfer of a carrier to said carrier-conveying tube for transmission from said terminal upon release of said detent.

11. A send hopper for temporarily storing and sequentially releasing carriers to an underlying vertically disposed tube, each said carrier having outwardly projecting shoulders proximate one end thereof, comprising:

a pair of elongated downwardly and rearwardly inclined spaced parallel carrier guide surfaces for supporting therebetween in vertical disposition a plurality of carriers having diametrically opposite portions of the shoulders thereof seated on said inclined guide surfaces to facilitate gravity-induced sliding movement of said carriers in a downward and rearward direction from a carrier-entrance end to a carrier-exit end, with said exit end being lower than said entrance end, a pair of elongated vertical guide surfaces having their upper ends disposed proximate said exit end of said inclined guide surfaces and their lower ends disposed below said upper ends, a vertically disposed guide member parallel to said vertical guide surfaces, said vertical guide member and pair of vertical guide surfaces cooperating to form a guide chute to guide downwardly a vertically disposed carrier as the shoulders thereof slide off said inclined guide surfaces at said exit end thereof, a carrier release member mounted below said lower ends of said vertical guide surfaces for selectively engaging the bottom of a carrier whose shoulders are positioned in said chute, said release member being movable to a release position disengaged from said carrier to release said carrier whereupon said released carrier moves downwardly under the force of gravity to exit said send hopper and enter said underlying tube, a carrier hold member mounted to selectively engage the lowermost carrier supported on said inclined guide surfaces, and when so engaged to prevent said lowermost carrier from sliding off said inclined guide surfaces into said chute, said hold member being movable to a release position to permit said lowermost carrier to slide off said inclined guide surfaces into said chute, an actuator controlling said release and hold members for causing said hold member to hold said lowermost carrier on said inclined guide surfaces when said release member moves to said release position, whereby only the one carrier in said chute exits said send hopper upon movement of said release member to said release position.

12. A send hopper for temporarily storing and sequentially releasing carriers to an underlying vertically disposed tube, each said carrier having outwardly projecting shoulders proximate one end thereof, comprising:

front, rear and opposite side walls defining a hopper housing, said front wall having an opening therein to facilitate insertion of a carrier into the interior of said hopper housing, a pair of elongated downwardly and rearwardly inclined spaced parallel carrier guide elements each secured to the interior surface of a different one of said side walls for supporting therebetween in vertical disposition a plurality of carriers having dimetrically opposite portions of the shoulders thereof seated on said inclined guide elements to facilitate gravity induced sliding movement of said carriers in a downward and rearward direction from a carrier-entrance end spaced from said front wall opening to a carrier-exit end spaced from said rear wall, with said exit end being lower than said entrance end, a pair of spaced parallel elongated vertical guide elements each secured to the interior surface of a different one of said side walls, with an upper end of said vertical guide elements proximate said exit end of one of said inclined guide elements, said vertical guide elements being spaced from said rear wall to form therewith a guide chute to guide downwardly a vertically disposed carrier as the shoulders thereof slide off said inclined guide elements at said exit end, a carrier release member mounted below a lower end of said vertical guide elements for selectively engaging the bottom of a carrier whose shoulders are positioned in said chute, said release member being movable to a release position disengaged from said carrier to release said carrier whereupon said released carrier moves downwardly under the force of gravity to exit said send hopper and enter said underlying tube, a carrier hold member mounted to selectively engage the lowermost carrier supported on said inclined guide elements, and when so engaged to prevent said lowermost carrier from sliding off said inclined guide elements into said chute, said hold member being movable to a release position to permit said lowermost carrier to slide off said inclined guide elements into said chute, and a leaf spring mounted inside said hopper housing having a portion thereof located to releasably restrict the region between said front wall and said entrance end of said inclined guide elements whereby, upon insertion of a carrier through said opening into said hopper housing for engagement of said carrier shoulders on said inclined guide elements, said leaf spring positively biases said carrier shoulders into seating engagement with said inclined guide elements.

13. A received-carrier hopper to temporarily store carriers having upper and lower outwardly projecting shoulders which are sequentially delivered from an open lower end of a vertically disposed tube overlying an input opening in said hopper, comprising:

- a carrier stop located below said input opening a distance exceeding the length of a carrier,
- a first pair of downwardly and rearwardly inclined spaced parallel guide elements disposed below said input opening arranged to engage the lower shoulders of a carrier delivered to said input opening and guide the lower end thereof toward said carrier stop,
- said first guide elements having upper ends disposed forwardly of the vertical center line of said input opening to assure engagement between said first guide elements and said lower shoulders of a descending carrier, said carrier stop being located rearwardly of the vertical center line of said input opening to facilitate gravity-induced pivoting in a forward direction of the upper end of a carrier whose lower end rests on said carrier stop,
- a second pair of downwardly and forwardly inclined spaced parallel guide elements having upper ends extending from said upper ends of said first guide elements and lower ends proximate a hopper output opening, said second guide elements arranged to engage the upper shoulders of a carrier which has pivoted forwardly upon engagement with said carrier stop to facilitate gravity-induced sliding of said carrier downwardly and forwardly along said second pair of guide elements to said hopper output opening, and
- carrier support means independent of said guide elements located in the region of said hopper output opening for supporting at least one carrier forwardly of said second guide elements to facilitate storage of at least one carrier prior to removal from said hopper output opening which one carrier has slid off said lower ends of said second pair of guide elements into said support means.

* * * * *